United States Patent [19]

Bardhan et al.

[11] Patent Number: 4,978,646

[45] Date of Patent: Dec. 18, 1990

[54] CAPACITORS AND HIGH DIELECTRIC CONSTANT CERAMICS THEREFOR

[75] Inventors: Pronob Bardhan, Corning; Roger F. Bartholomew, Painted Post; Donald M. Trotter, Jr., Newfield; Chyang J. Yu, Painted Post, all of N.Y.

[73] Assignee: Corning Incorporated, Corning, N.Y.

[21] Appl. No.: 318,698

[22] Filed: Mar. 3, 1989

[51] Int. Cl.$^5$ .................... C04B 35/02; C04B 35/46
[52] U.S. Cl. .................. 501/134; 501/135; 501/136; 501/137; 501/138; 501/139
[58] Field of Search ............... 501/134, 135, 136, 137, 501/138, 139

[56] References Cited

U.S. PATENT DOCUMENTS

| | | | |
|---|---|---|---|
| 3,997,457 | 12/1976 | Takahashi et al. | 501/136 |
| 4,054,531 | 10/1977 | Takahashi et al. | 501/136 |

FOREIGN PATENT DOCUMENTS

| | | | |
|---|---|---|---|
| 2445680 | 8/1980 | France | 501/137 |
| 54-018392 | 7/1979 | Japan | 501/134 |
| 57-154705 | 9/1982 | Japan | 501/134 |
| 57-154706 | 9/1982 | Japan | 501/134 |
| 57-154707 | 9/1982 | Japan | 501/134 |
| 1169959 | 7/1985 | U.S.S.R. | 501/134 |
| 2077253 | 12/1981 | United Kingdom | 501/136 |

*Primary Examiner*—Mark L. Bell
*Assistant Examiner*—Anthony J. Green
*Attorney, Agent, or Firm*—Clinton S. Janes, Jr.

[57] ABSTRACT

This invention relates to the production of ceramic materials which exhibit a dielectric constant in excess of 105, when measured at room temperature, and a small temperature coefficient of capacitance across the temperature range of −55° to 125° C., when compared to the capacitance measured at room temperature, which material has a composition encompassed within one of the following general formulae:

$$(Bi_2O_2)^{2+}(A_{m-1}B_mO_{3m+1})^{2-}; \qquad (I)$$

$$(Bi_2O_2)^{2+}(A_{m-1}B_mZr_\beta O_{3m+\delta+1})^{2-}; \text{ and} \qquad (II)$$

$$(Bi_2O_2)^{2+}(A_{m-1}B_mMn_\gamma O_{3m+\delta+1})^{2-} \qquad (III)$$

$$(Bi_2O_2)^{2+}(A_{m-1}B_mZr_\beta Mn_\gamma O_{3m+\delta+1})^{2-} \qquad (IV)$$

wherein A consists essentially of at least one element selected from the group consisting of Na, K, Ca, Sr, Ba, Bi, and Pb, and B consists essentially of at least one element selected from the group consisting of Nb, Ta, and Ti, at least part of which is replaced with combinations of a wide variety of ions, and wherein m, $\beta$, $\gamma$, and $\delta$ are greater than 0.

23 Claims, 4 Drawing Sheets

CAPACITORS AND HIGH DIELECTRIC CONSTANT CERAMICS THEREFOR

BACKGROUND OF THE INVENTION

This invention relates to improved bismuth-containing dielectric ceramic compositions suitable for producing ceramic capacitors. Mixed ion substitution and dopants are utilized in producing novel compositions that are stable over a wide temperature range.

Ceramics suitable for use in capacitors are characterized by a high dielectric constant. In conventional ceramics, however, the dielectric constant has shown a strong dependence on temperature. The behavior of the capacitance with respect to temperature is quantified in a single term called the Temperature Coefficient of Capacitance (hereafter referred to as TCC) which is expressed in terms of parts per million (ppm)/° C. Careful material selection and processing have made possible the development of dielectric ceramic bodies that have very small TCC's over a wide range of temperature. This phenomenon can occur when a multiphase body is formed in which each phase with a positive TCC is counterbalanced by one or more phases with an equivalently negative TCC. Certain bodies in which this compensating effect is present have Temperature Coefficients of Capacitance that are unusually small and are known as Negative-Positive-Zero or NPO bodies.

Though the acronym NPO denotes zero variation in the capacitance, the limit of acceptability for capacitors, as dictated to industry by the Electronic Industries Association (EIA), is ±30 ppm/° C. from room temperature across the temperature range of −55° C. to 125° C. at a frequency of either 1 KHz or 1 MHz, depending on the capacitance of the material. By the same standards, the loss tangent must not be greater than 0.1% at the same frequencies and at room temperature.

Temperature compensation has typically been approached in one of two ways: first, the mixtures of two types of compounds with an opposite sign of TCC have been chosen such that the positive TCC of one type of compound(s) compensates the negative TCC of the other type of compound(s); or second, mixtures of doped or undoped layers, such as $SrTiO_3$, and a layered structure compound have been chosen such that the positive TCC of the layer compensates the negative TCC of the layered structure compound. By varying the relative proportions of the compounds used, a series of temperature compensating capacitors with various values of TCC can be obtained.

The concept of temperature compensating ceramic capacitors is not new to the scientific community. An NPO body utilizing varying ratios of $MgTiO_3$ and $TiO_2$ was developed as early of the 1930's; it had a dielectric constant of 15. At the same time exploration of the $SrO-TiO_2$ system yielded an NPO body with a dielectric constant of 25. The ensuing two decades hosted much research on NPO materials, being highlighted by the exploration of the $BaO-4.6TiO_2$ system which yielded an NPO body with a dielectric constant of 35. This research also led to the exploration of the rare earth oxide-titania system and the development of an NPO body with a dielectric constant of 62 in the 1960's. Currently, most of the developmental work on NPO-type dielectrics is based on the rare earth oxide-titania system, where materials with dielectric constants of 80 and 102 have been developed. These materials are the basis of ceramic capacitor manufacturing today.

Ceramic capacitors have proven to be an integral part of the electronics industry where the increased emphasis on volume efficiency has catalyzed an effort to not only find novel materials, but also to make smaller and smaller capacitors to keep pace with the continuing volume reduction of the silicon chip. Temperature stable ceramic capacitors have proven useful in areas where a constant voltage is needed or diversion of potentially damaging electrical surges is desired. These include timing circuits, television tuner circuits, resonator circuits, and voltage multiplying rectifiers of oscilloscopes.

OBJECTS OF THE INVENTION

It is therefore an object of this invention to provide novel compositions for temperature compensating dielectric ceramic bodies for use in the development of, but not limited to, ceramic capacitors.

It is a another object of this invention to provide material compositions having temperature independent capacitance features, a lower dissipation factor, and a higher dielectric constant than capacitors made with those materials manufactured today.

The most preferred object of this invention is to provide NPO bodies that meet or exceed the EIA specifications for TCC and dissipation factor.

SUMMARY OF THE INVENTION

Those and other objects which are described hereinafter can be secured through compositions described by the general formula where m is greater than 1, $\beta \geq 0$, $\gamma \geq 0$ and $\delta$ is determined by the oxygen contributions of Zr and Mn when added in oxide form. In this formula A is an element selected from the group consisting of Na, K, Ca, Sr, Ba, Bi, and Pb, and B is an element selected from the group consisting essentially of Ti, Nb, and Ta. In the case where A is a divalent ion, it may be replaced by mixtures of two or more ions such as $Ca_{0.6}Sr_{0.4}$ and $Ca_{0.5}Sr_{0.4}Ba_{0.1}$. It is therefore an object of this invention to show that A and B must be chosen carefully to obtain the temperature compensating effect.

Further embodied in this invention are the following derivatives of the general formula. As was noted above, $\delta$ added to the batch as zirconia and manganese oxide, but is determined by the oxygen contribution of Zr and Mn when will be greater than 0.

(I)

Mixed ion substitution only;

(II)

Mixed ion substitution+Mn;

(III)

Mixed ion substitution+Zr;

(IV)

Mixed ion substitution+Mn, Zr;

Materials with mixed ions replacing ions with equal charge have shown a small TCC and a high dielectric constant; however, a combination of zirconium oxide and manganese oxide is needed to lower the dissipation factor below 0.1%

It is yet another object of this invention to introduce compositions prescribed by the general formula where the TCC is small and the dissipation factor is less than 0.1%.

Many compounds defined by the said general formula exhibit a linear dependence of capacitance on temperature. However, if B is replaced by mixed ions such as;

$$C_{\frac{1}{2}}^{2+}D_{\frac{1}{2}}^{5+}, E_{\frac{1}{4}}^{1+}D_{\frac{3}{4}}^{5+}, F_{\frac{1}{2}}^{3+}D_{\frac{1}{2}}^{5+}, \text{ or } F_{\frac{2}{3}}^{3+}G_{\frac{1}{3}}^{6+}$$

where
$C^{2+} = Mg^{2+}, Zn^{2+}, Ni^{2+}, Co^{2+}, Cu^{2+}, Cd^{2+}$
$D^{5+} = Nb^{5+}, Ta^{5+}$
$E^{1+} = Li^{1+}, Na^{1+}, K^{1+}, Cu^{1+}, Ag^{1+}$
$F^{3+} = Cr^{3+}, Mn^{3+}, Fe^{3+}, Al^{3+}, Ga^{3+}, Zn^{3+}, Tl^{3+}, Sb^{3+}, As^{3+}, Y^{3+}, Lu^{3+}, Yb^{3+}, Tm^{3+}, Er^{3+}, Ho^{3+}, Dy^{3+}, Tb^{3+}, Gd^{3+}, Eu^{3+}, Sm^{3+},$ and
$G^{6+} = W^{6+}, Mo^{6+}$ the TCC of these compounds becomes very small at temperatures between $-55°$ C. and 125° C. In accordance with this invention, this is a method for obtaining stability with respect to temperature; i.e., charge-balanced substitution can be used to eliminate the strong temperature dependence of the dielectric constant in these materials.

Further modification of this system of ion-substituted, layered-structured compounds can lead to an improved reproducible multilayer ceramic capacitor that meets or exceeds the NPO specifications for temperature stability and dissipation factor. The result is an NPO body that has a dissipation factor less than 0.1%, a small TCC, and a dielectric constant greater than 105, as compared to NPO capacitors currently manufactured that exhibit a dielectric constant that is between 80 and 102.

PRIOR ART

As previously stated, the scientific community has been cognizant of the concept of temperature compensating capacitors for quite some time. For example:

U.S. Pat. No. 3,529,978 describes an improved ceramic dielectric composition consisting essentially of BaTiO$_3$ in which the temperature coefficient and processing characteristics are greatly enhanced by the coordinated additions of a minor amount of a negative additive material such as Bi$_2$NbTiO$_9$, CaBi$_2$Nb$_2$O$_9$, SrBi$_2$Nb$_2$O$_9$, BaBi$_2$Nb$_2$O$_9$, PbBi$_2$Nb$_2$O$_9$, KBi$_5$Nb$_4$O$_{18}$, NaBi$_5$Nb$_4$O$_{18}$, CdBi$_2$Nb$_2$O$_9$, SrBi$_2$Ta$_2$O$_9$, Bi$_3$NbSnO$_9$, Sb$_3$NbTiO$_9$, and Bi$_3$NbZrO$_9$, and a positive additive material such as ZnO or MgO. Though temperature compensation is an objective of these compositions, neither mixed ion substitution nor zirconium oxide and/or manganese oxide doping is mentioned. Also, the Bi- and Nb-containing compounds utilized in the present invention are the major constituent of the composition, whereas BaTiO$_3$ is the major constituent of the patented compositions.

U.S. Pat. No. 4,058,404 describes a sintered ceramic dielectric body consisting essentially of 18–70 wt % SrTiO$_3$, 4–75 wt % BaTiO$_3$, 2.5–7.4 wt % Bi$_2$O$_3$, and 1.7–20 wt % TiO$_2$ wherein the molar ratio of TiO$_2$ to Bi$_2$O$_3$ falls within the range of 1–18. Neither mixed ion substitution nor zirconium oxide and/or manganese oxide doping is mentioned. Also, the Bi- and Nb-containing compounds utilized in the present invention are the major constituents of the composition, whereas BaTiO$_3$ and/or SrTiO$_3$ are the major constituents of this composition.

U.S. Pat. No. 4,459,364 describes a low-fired ceramic composition comprising BaTiO$_3$, Bi$_2$O$_3$, Nb$_2$O$_5$, TiO$_2$, and MnCO$_3$ used in making a multilayer ceramic capacitor. Neither mixed ion substitution nor zirconium oxide and/or manganese oxide doping is mentioned. Also, the Bi- and Nb-containing compounds utilized in the present invention are the major constituents of the compositions, whereas BaTiO$_3$ is the major constituent of the patented composition.

U.S. Pat. No. 4,482,934 discloses a ceramic dielectric composition for temperature compensating capacitors comprising 64–70.5 wt % SrTiO$_3$, 28–34 wt % CaTiO$_3$, and 1.5–4.5 wt % Bi$_2$O$_3$ or Bi$_2$O$_3$-nTiO$_2$, where n=1 to 5, and not more than 10 wt % MgTiO$_3$. Neither mixed ion substitution nor zirconium oxide and/or manganese oxide doping is mentioned. Also, the Bi- and Nb-containing compounds utilized in the present invention are the major constituents of the composition, whereas BaTiO$_3$ is the major constituent of this composition.

U.S. Pat. No. 4,503,482 details a ceramic dielectric composition based on bismuth-containing BaTiO$_3$ in the form of a monophase mixed crystal-ceramic in which 0.02–0.12 moles of the layer perovskite PbBi$_4$Ti$_4$O$_{15}$ or SrBi$_4$Ti$_4$O$_{15}$ per mole of BaTiO$_3$ are provided. Neither mixed ion substitution nor zirconium oxide and/or manganese oxide doping is mentioned. Also, the Bi- and Nb-containing compounds utilized in the present invention are the major constituents of the compositions, whereas BaTiO$_3$ is the major constituent of the patented composition.

DESCRIPTION OF PREFERRED EMBODIMENTS

One group of preferred embodiments of this invention comprises compounds contained within the scope of the formula $(Bi_2O_2)^{2+}(A_{m-1}B_mO_{3m+1})^{2-}$. A particularly preferred species of those embodiments comprises compositions in which m=4 and A is a mixture of two or more ions, leading to the formulas ABi$_4$Ti$_4$O$_{15}$ and A$'_{0.5}$Bi$_{4.5}$Ti$_4$O$_{15}$, where A is an element selected from the group consisting of Ba, Pb, Bi, Sr, and Ca, and A$'$ is an element selected from the group consisting of K and Na. In this case, the Ti$^{4+}$ ion may be replaced at least in part by mixed ions such as:

$$C_{\frac{1}{2}}^{2+}D_{170}^{5+}, E_{\frac{1}{4}}^{1+}D_{\frac{3}{4}}^{5+}, F_{\frac{1}{2}}^{3+}D_{\frac{1}{2}}^{5+}, \text{ or } F_{\frac{2}{3}}^{3+}G_{\frac{1}{3}}^{6+}$$

where
$C^{2+} = Mg^{2+}, Zn^{2+}, Ni^{2+}, Co^{2+}, Cu^{2+}, Cd^{2+}$
$D^{5+} = Nb^{5+}, Ta^{5+}$
$E^{1+} = Li^{1+}, Na^{1+}, K^{1+}, Cu^{1+}, Ag^{1+}$
$F^{3+} = Cr^{3+}, Mn^{3+}, Fe^{3+}, Al^{3+}, Ga^{3+}, Zn^{3+}, Tl^{3+}, Sb^{3+}, As^{3+}, Y^{3+}, Lu^{3+}, Yb^{3+}, Tm^{3+}, Er^{3+}, Ho^{3+}, Dy^{3+}, Tb^{3+}, Gd^{3+}, Eu^{3+}, Sm^{3+},$ and
$G^{6+} = W^{6+}, Mo^{6+}$ Examples of such replacements include: $CaBi_4(Mg_{\frac{1}{3}}Nb_{\frac{2}{3}})_4O_{15}$, $SrBi_4(Mg_{\frac{1}{3}}Nb_{\frac{2}{3}})_4O_{15}$, $CaBi_4Ni_{4/3}Nb_{8/3}O_{15}$, $CaBi_4Cu_{4/3}Nb_{8/3}O_{15}$, and $CaBi_4Fe_{8/3}W_{4/3}O_{15}$.

As was observed above, several factors have been introduced within the context of the present invention that independently and collectively affect the dielectric constant, dissipation factor, and TCC. Mixed ion substitution significantly increases the dielectric constant and minimizes the TCC. Examples 1-4 are illustrative of that feature where Zr and Mn are absent from the general formula so that the effects of ion substitution can readily be examined. Examples 1-3 reflect mixed ion substitution for the B component in Formula I and Example 4 illustrates mixed ion substitution for the A component in Formula I.

EXAMPLE 1

Ceramics of compositions $CaBi_4Ti_4O_{15}$ and $CaBi_4(Mg_{\frac{1}{3}}Nb_{\frac{2}{3}})_4O_{15}$ were prepared as follows:

Batches of $CaBi_4O_{15}$ and $CaBi_4(Mg_{\frac{1}{3}}Nb_{\frac{2}{3}})_4O_{15}$ were synthesized with 4.29 wt % CaO, 71.27 wt % $Bi_2O_3$, and 24.44 wt % $TiO_2$ and 4.02 wt % CaO, 66.75 wt % $Bi_2O_3$, 3.85 wt % MgO, and 25.38 wt % $Nb_2O_5$, respectively, and mixed for 16-20 hours in a vibromill. The resulting mixtures were calcined for 2-3 hours in air at temperatures between 700° C. and 1050° C. In the two-phase mixture experiments described in Example 4, the pre-reacted powder was mixed with $SrTiO_3$ by vibromilling. All powders were then dried and milled again with the addition of a carbowax solution as a binder. The powders were dried, scalped through a 20 mesh sieve to reduce the agglomerate size, and pressed into pellets; first mechanically at 10 ksi, then isostatically at 27 ksi. Next, the pellets were sintered for 2 hours on a zirconia setter plate at temperatures between 900° C. and 1270° C. Gold was then deposited by evaporation onto the surfaces of the pellets for use as electrodes. The dielectric constants and loss tangents were measured at temperatures between −55° C. and 125° C. and at frequencies of 120 Hz, 1 kHz, and 10 kHz. The dielectric constant, K, and the dissipation factor, DF, as a function of temperature of the samples at a frequency of 1 KHz are given in Table I. These temperature stable dielectrics have the unique properties of having a high dielectric constant, low dissipation factor, and low temperature sintering. The increase in stability and decrease in dissipation factor can be noted as the Mg+Nb substitution for Ti is effected.

TABLE I

| | $CaBi_4Ti_4O_{15}$ Sintering | | $CaBi_4(Mg_{\frac{1}{3}}Nb_{\frac{2}{3}})_4O_{15}$ | | | |
|---|---|---|---|---|---|---|
| Sintering Temp. | 1120° C. | | 900° C. | | 1120° C. | |
| Temp.(°C.) | K | DF (%) | K | DF (%) | K | DF (%) |
| −55 | 171 | 0.6 | 132 | 0.5 | 136 | 0.6 |
| −40 | 169 | 1.8 | 133 | 1.2 | 136 | 1.1 |
| −20 | 171 | 3.9 | 133 | 1.4 | 136 | 1.5 |
| 0 | 172 | 4.8 | 130 | 0.4 | 135 | 0.7 |
| 20 | 160 | 0.7 | 130 | 0.4 | 135 | 0.7 |
| 40 | 158 | 0.7 | 130 | 0.6 | 135 | 0.9 |
| 60 | 156 | 0.7 | 130 | 0.7 | 133 | 1.2 |
| 80 | 155 | 0.8 | 130 | 1.1 | 135 | 1.8 |
| 100 | 155 | 1.0 | 130 | 1.8 | 135 | 3.0 |
| 125 | 153 | 1.5 | 133 | 3.7 | 138 | 6.7 |

EXAMPLE 2

Ceramics of compositions $SrBi_4Ti_4O_{15}$ and $SrBi_4(Mg_{\frac{1}{3}}Nb_{\frac{2}{3}})_4O_{15}$ were prepared as follows:

Batches of and $SrBi_4Ti_4O_{15}$ and $SrBi_4(Mg_{\frac{1}{3}}Nb_{170})_4O_{15}$ were synthesized utilizing 7.65 wt % SrO, 68.77 wt % $Bi_2O_3$, and 23.58 wt % $TiO_2$, and 7.18 wt % SrO, 64.55 wt % $Bi_2O_3$, 3.72 wt % MgO, and 24.55 wt % $Nb_2O_5$, respectively. The constituents of each batch were weighed, mixed, placed in a polypropylene bottle with ⅜ inch diameter zirconia grinding media and isopropyl alcohol (IPA), and milled for 4-64 hours. The resulting slurries were placed in a drying dish, dried in an oven at 80° C., and calcined in covered porcelain crucibles at 750° C. for 4 hours. The calcined powder was then pressed into pills, first mechanically at 10 ksi, then isostatically at 27 ksi. Samples were sintered for 2 hours at temperatures between 1000° C. and 1100° C., electroded with gold films as in the previous example, and dielectric properties measured. These are shown in Table II. As in Example 1, the mixed ion substitution of $Mg_{\frac{1}{3}}Nb_{\frac{2}{3}}$ for Ti has greatly reduced the variation of dielectric constant with temperature and lowered the dissipation factor of the material.

TABLE II

| | $SrBi_4Ti_4O_{15}$ 1120° C. | | $SrBi_4(Mg_{\frac{1}{3}}Nb_{\frac{2}{3}})_4O_{15}$ 1120° C. | |
|---|---|---|---|---|
| Sintering Temp.(°C.) | K | DF (%) | K | DF (%) |
| −55 | 251 | 1.7 | 146 | 0.4 |
| −40 | 251 | 2.5 | 146 | 0.9 |
| −20 | 260 | 4.7 | 147 | 1.7 |
| 0 | 253 | 3.0 | 146 | 0.5 |
| 20 | 253 | 1.7 | 145 | 0.4 |
| 40 | 256 | 1.8 | 145 | 0.5 |
| 60 | 256 | 1.8 | 145 | 0.6 |
| 80 | 260 | 1.9 | 145 | 0.9 |
| 100 | 262 | 2.0 | 145 | 1.4 |
| 125 | 269 | 2.2 | 146 | 2.7 |

EXAMPLE 3

Additional combinations of mixed ions were utilized in synthesizing $CaBi_4Ni_{4/3}Nb_{8/3}O_{15}$, $CaBi_4Cu_{4/3}Nb_{8/3}O_{15}$, and $CaBi_4Fe_{8/3}W_{4/3}O_{15}$, which were comprised of 4.03 wt % CaO, 66.94 wt % $Bi_2O_3$, 3.58 wt % NiO, and 25.45 wt % $Nb_2O_3$, 4.02 wt % CaO, 66.78 wt % $Bi_2O_3$, 3.80 wt % CuO, and 25.40 wt % $Nb_2O_3$, and 4.14 wt % CaO, 68.75 wt % $Bi_2O_3$, 15.71 wt % $Fe_2O_3$, and 11.40 wt % $WO_3$, respectively. Some substitutions provide a better combination of properties than others, as is evidenced in Table III. Common to all compositions is a high dielectric constant but, in some instances, at the expense of a high dissipation factor.

TABLE III

| | Sintered at 900° C./2 hrs. | | | | Sintered at 1120° C./2 hrs. | | | |
|---|---|---|---|---|---|---|---|---|
| | 1 KHz | | 1 MHz | | 1 KHz | | 1 MHz | |
| Temp. | DF (%) | K | DF (%) | K | DF (%) | K | DF (%) | K |
| | $CaBi_4Ni_{4/3}Nb_{8/3}O_{15}$ | | | | $CaBi_4Ni_{4/3}Nb_{8/3}O_{15}$ | | | |
| 125 | 2.00 | 156 | 2.50 | 152 | 4.50 | 152 | 3.90 | 142 |
| 100 | 2.10 | 156 | 2.90 | 150 | 4.60 | 149 | 3.30 | 142 |
| 80 | 2.40 | 154 | 3.40 | 148 | 4.20 | 146 | 2.50 | 139 |
| 60 | 2.80 | 152 | 4.10 | 146 | 3.50 | 142 | 1.70 | 139 |
| 40 | 3.40 | 150 | 4.40 | 141 | 2.60 | 142 | 1.20 | 139 |
| 20 | 4.20 | 148 | 3.60 | 137 | 1.60 | 139 | 0.80 | 139 |
| 0 | 4.30 | 141 | 2.00 | 135 | 1.50 | 139 | 0.70 | 139 |
| −20 | 4.10 | 141 | 1.60 | 135 | 2.90 | 142 | 1.20 | 139 |
| −40 | 2.50 | 139 | 1.00 | 135 | 2.20 | 142 | 1.00 | 139 |
| −55 | 1.10 | 135 | 0.50 | 135 | 0.90 | 142 | 0.50 | 139 |

TABLE III-continued

| | Sintered at 900° C./2 hrs. | | | | Sintered at 1120° C./2 hrs. | | | |
|---|---|---|---|---|---|---|---|---|
| | 1 KHz | | 1 MHz | | 1 KHz | | 1 MHz | |
| Temp. | DF (%) | K | DF (%) | K | DF (%) | K | DF (%) | K |
| | $CaBi_4Cu_{4/3}Nb_{8/3}O_{15}$ | | | | $CaBi_4W_{4/3}Nb_{8/3}O_{15}$ | | | |
| 125 | 2.10 | 239 | 5.00 | 232 | 31.9 | 1217 | 37.2 | 800 |
| 100 | 2.20 | 239 | 5.80 | 226 | 31.2 | 996 | 54.7 | 538 |
| 80 | 2.50 | 237 | 6.60 | 224 | 40.9 | 780 | 66.2 | 325 |
| 60 | 3.00 | 234 | 7.50 | 216 | 58.0 | 497 | 59.8 | 202 |
| 40 | 3.70 | 229 | 8.60 | 211 | 63.6 | 279 | 43.4 | 141 |
| 20 | 4.50 | 224 | 10.00 | 204 | 49.7 | 173 | 28.5 | 109 |
| 0 | 5.50 | 219 | 9.10 | 204 | 39.3 | 144 | 22.4 | 99 |
| −20 | 7.60 | 211 | 13.60 | 176 | 21.7 | 100 | 12.3 | 81 |
| −40 | 10.7 | 196 | 12.60 | 159 | 12.0 | 82 | 7.20 | 73 |
| −55 | 12.3 | 179 | 10.00 | 148 | 7.40 | 75 | 5.60 | 69 |

EXAMPLE 4

Temperature stable formulations are obtained when mixed ion substitutions in the A site are effected by mixing two end member compounds in the proper ratio; the two such end member compounds must have essentially constant TCC's of opposite sign between −55° C. and 125° C. For example, if the temperature stable compounds described in Examples 1 and 2 are combined to form $x[CaBi_4Ti_4O_{15}]\text{-}(1-x)[SrBi_4Ti_4O_{15}](0<x<1)$, superior values of the room temperature dielectric constant (K) and a reduced dissipation factor (DF) can be obtained, as evidenced by the data in Table IV. The constituents of the batch (in wt %) at varying proportions of x are set out below wherein x is the mole fraction $CaBi_4Ti_4O_{15}/SrBi_4Ti_4O_{15}$:

| | x | | | | |
|---|---|---|---|---|---|
| | 0.00 | 0.25 | 0.50 | 0.75 | 1.00 |
| CaO | 0.00 | 1.04 | 2.11 | 3.19 | 4.29 |
| SrO | 7.65 | 5.79 | 3.89 | 1.96 | 0.00 |
| $Bi_2O_3$ | 68.77 | 69.38 | 70.00 | 70.63 | 71.27 |
| $TiO_2$ | 23.58 | 23.79 | 24.00 | 24.22 | 24.44 |

Note that the dielectric constant and dissipation factor (at a frequency of 1 KHz) become smaller as the mole fraction of $CaBi_4Ti_4O_{15}$ increases, while the TCC becomes more negative.

TABLE IV

| x | K | DF (%) | TCC (ppm/°C.) −55° C. to 25° C. | TCC (ppm/°C.) 25° C. to 125° C. |
|---|---|---|---|---|
| 0 | 253 | 1.7 | 105 | 632 |
| 0.25 | 185 | 1.0 | −183 | 313 |
| 0.50 | 161 | 0.9 | −218 | 167 |
| 0.75 | 185 | 0.9 | −583 | −167 |
| 1.00 | 160 | 0.7 | −917 | −417 |

Though excellent values of dielectric constant and TCC are common to Examples 1–4, the dissipation factor still exceeds the 0.1% upper limit imposed by the EIA. Several studies were undertaken to solve this problem. Ceramics exhibiting unusually good combinations of small TCC and low dissipation factor were found when Mn+Zr were added to the composition $SrBi_4(Mg_{\frac{1}{3}}Nb_{2/3})_4O_{15}$. The effects of each individual dopant were determined, first with $MnO_2$ in Example 5 (Formula II), then with $ZrO_2$ in Examples 6–8 (Formula III).

EXAMPLE 5

Figure 1:
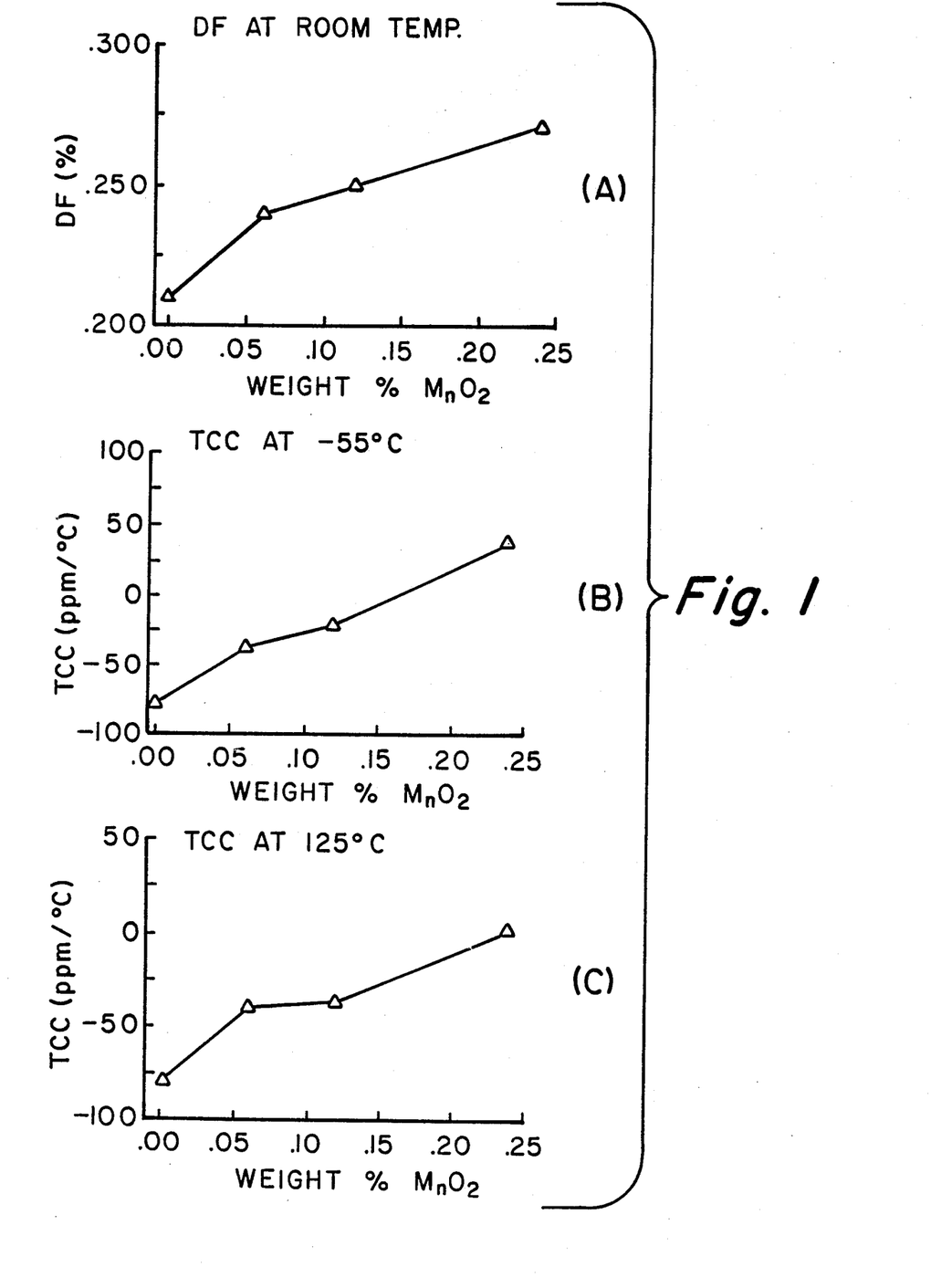
FIGS. 1–4 comprise graphs depicting measurements of dielectric constant, dissipation factor, and temperature coefficient of capacitance carried out on samples of the inventive materials.

A 1000 g batch consisting of 64.55 wt % (626.41 g) $Bi_2O_3$, 7.18 wt % (99.23 g) $SrCO_3$, 3.72 wt % (36.13 g) MgO, and 24.55 wt % (238.23 g) $Nb_2O_5$ [$SrBi_4Mg_{4/3}Nb_{8/3}O_{15}$] was mixed for 1 hour in a tubular mixer and divided into eight 125 g batches before being vibromilled for 16 hours. Part of the batch was doped with $MnO_2$ powder at levels of 0.00, 0.03, 0.06, and 0.12 wt %, while another part was doped with an aqueous solution of $Mn(NO_3)_2$ at levels of 0.06, 0.12, and 0.24 wt % $MnO_2$ The powders were then dried in an oven, where appropriate, and calcined for 2 hours at 580° C., followed by rapid heating to 750° C. with a 4 hour hold. Alternatively, previously calcined batches of the same composition were doped at the same levels utilizing the same procedure. All batches were vibromilled for 16 hours in IPA and a carbowax solution. The slurries were then dried in an oven, pressed into pellets, first mechanically at 10 ksi then isostatically at 27 ksi, and sintered in a gradient furnace for 10 minutes at temperatures between 1000° and 1100° C. The resulting samples were electroded and their dielectric properties measured as in the previous examples. The data are shown in FIG. 1. Thus, FIG. 1a reports the Dissipation Factors at room temperature and FIGS. 1b and 1c record the Temperature Coefficients of Capacitance at −55° C. and 125° C., respectively. Note that Mn additions make the TCC less negative while making the dissipation factor increase.

EXAMPLE 6

Figure 2:
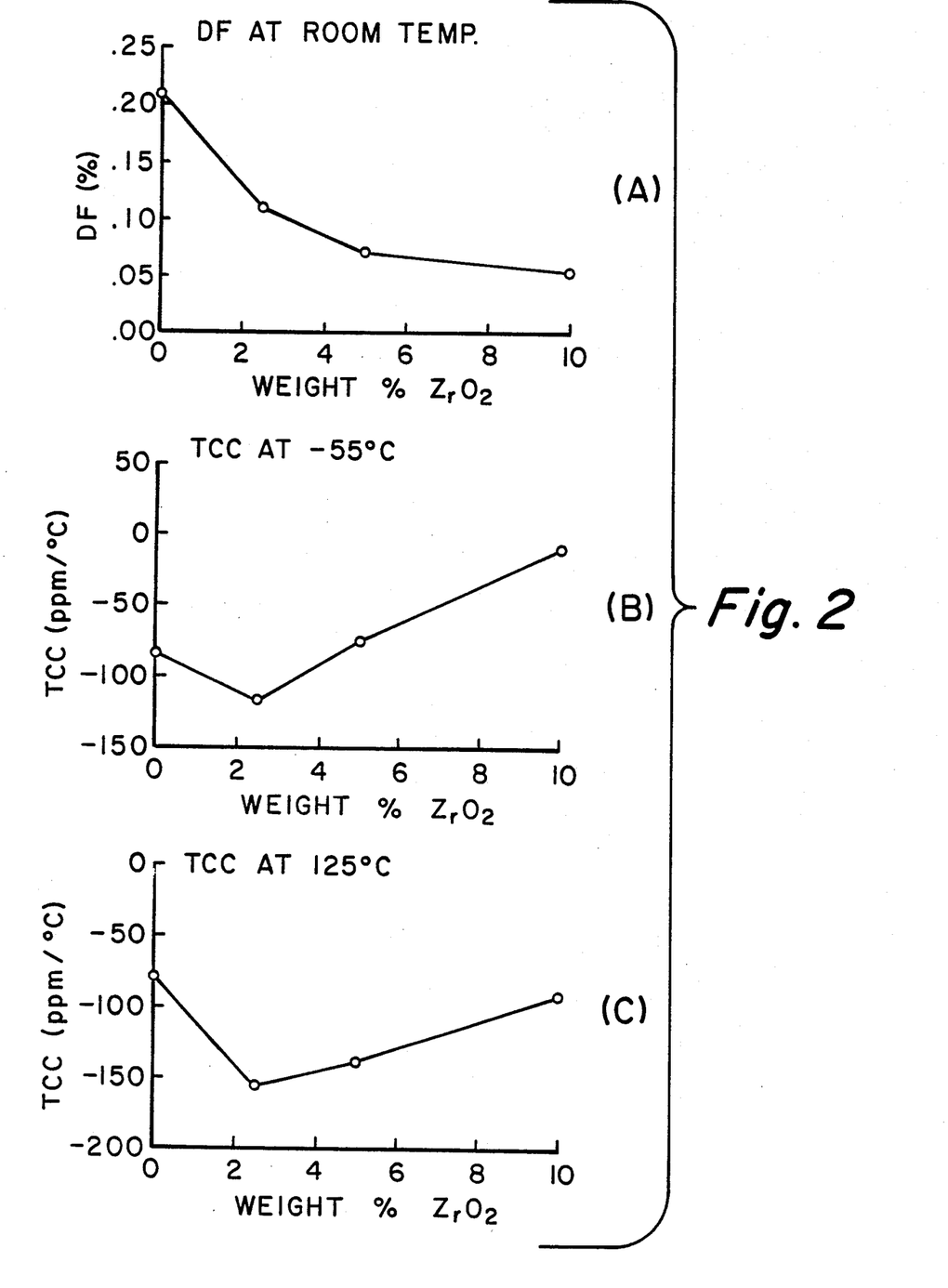

Four 25 gram lots of the calcined powder of Example 2 were prepared by adding 0.00, 2.5, 5.0, and 10.0 wt % $ZrO_2$. Two 25 g batches were prepared by adding 2.5 and 7.5 wt % $ZrO_2$ to the portions of the powder of Example 5, to which no Mn had been added. Finally, three batches were made by adding ZrO and $Nb_2O_5$ to the Mn-free powder of Example 5. The results are shown in FIG. 2. Hence, FIG. 2a graphs the Dissipation Factors at room temperature and FIGS. 2b and 2c set out the Temperature Coefficients of Capacitance at −55° C. and 125° C., respectively. Note that zirconia additions greater than about 2.5 wt % raise the dielectric constant and reduce the dissipation factor.

EXAMPLE 7

A 1000 g batch consisting of 626.41 g $Bi_2O_3$, 99.23 g $SrCO_3$, 36.13 g MgO, and 238.23 g $Nb_2O_5$ [$SrBi_4Mg_{4/3}Nb_{8/3}O_{15}$] was mixed for 1 hour in a tubular mixer and divided into eight 125 g batches before being vibromilled for 16 hours. The powder was then dried in an oven, where appropriate, and calcined for 4 hours at 750° C. The calcined batch was then doped with 11 wt % zirconia and vibromilled for 16 hours in IPA and a carbowax solution. The slurries were then dried in an oven, pressed into pellets, first mechanically at 10 ksi, then isostatically at 27 ksi, sintered in a gradient furnace for 2 hours at 1050° C., cooled to room temperature, and annealed at 300° C. for 72 hours. The resulting samples were electroded and their dielectric properties measured as in previous examples. The data are shown in Table V.

TABLE V

| Frequency | K | DF (%) | TCC (−55° C.) | TCC (125° C.) |
|---|---|---|---|---|
| 1 KHz | 122 | 0.04 | 0 ppm/°C. | 24 ppm/°C. |

TABLE V-continued

| Frequency | K | DF (%) | TCC (−55° C.) | TCC (125° C.) |
|---|---|---|---|---|
| 1 MHz | 122 | 0.04 | 5 ppm/°C. | −17 ppm/°C. |

As can be appreciated, the relative proportion of each ion used in mixed ion substitution is important in producing a material with suitable properties. Example 8, containing a higher proportion of MgO, is illustrative of that factor; hence, Example 8 shows a dramatic decrease in dielectric constant.

EXAMPLE 8

A batch consisting of 186.384 g of $Bi_2O_3$, 29.524 g of $SrCO_3$, 5.3749 g of MgO, and 70.883 g of $Nb_2O_5$ was mixed for 1 hour in a tubular mixer and vibromilled for 16 hours. The powder was then dried in an oven, where appropriate, and calcined for 4 hours at 750° C. A 28.3366 g portion of this calcined batch was then mixed with 1.4168 g of $ZrO_2$ and vibromilled for 16 hours in IPA and a carbowax solution. The slurries were then dried in an oven, pressed into pellets, first mechanically at 10 ksi, then isostatically at 27 ksi, and then sintered in a gradient furnace for 2 hours at 1020° C. The resulting samples were electroded and their dielectric properties were measured at a frequency of 1 KHz as in previous examples. The data are shown in Table VI.

TABLE VI

| K | DF (%) | TCC (−55° C.) | TCC (125° C.) |
|---|---|---|---|
| 83 | 0.09 | 18 ppm/°C. | −26 ppm/°C. |

The most preferred embodiments of the present invention comprise Formula IV; i.e., mixed ion substitutions in the B component of the general formula accompanied with additions of Mn and Zr. Such compositions provide a very desirable combination of high dielectric constant, low dissipation factor, and small temperature coefficient of capacitance. Example 9 illustrates such materials.

EXAMPLE 9

A 1000 g batch consisting of 64.55 wt % (626.41 g) $Bi_2O_3$, 7.18 wt % (99.23 g) $SrCO_3$, 3.72 wt % (36.13 g) MgO, and 24.55 wt % (238.23 g) $Nb_2O_5[SrBi_{4/3}Nb_{8/3}O_{15}]$ was dry mixed in a tubular mixer for 15 minutes before being separated into two-500 g batches. Each 500 g batch was placed into a polypropylene bottle with 500 g of ¼ inch diameter zirconia grinding media, filled to the neck with IPA, and vibromilled for 15–20 hours. The contents were transferred to a drying dish, dried in an oven at 80° C., scalped through a 500 μm mesh screen to reduce the agglomerate size, and calcined in porcelain crucibles for 4 hours at 750° C.

The batch was further divided into 100 g batches; one set was doped with 5 wt % $ZrO_2$ and with levels of $MnO_2$ varying from 0.35–0.45 wt %. A second set was doped with 0.4 wt % $MnO_2$ and with levels of $ZrO_2$ ranging from 4.5–5.5%. Both sets were vibromilled for 4 hours to assure homogeneous mixing of the dopants. Vibromilling was done in polypropylene bottles with 200 g of ¼ inch diameter zirconia grinding media and IPA. The resulting slurry was dried in an oven and made into a slip utilizing the following procedure:

a. thirty-six grams of distilled water, 0.16 g of Triton CF-10 (a commercial wetting agent), 0.8–2.5 g of Polyammonium Vinyl Sulfonate (dispersant), 450 g of ⅜ inch diameter zirconia grinding media, and 100 g of ceramic powder were mixed in order as listed, to form a slip;

b. the slip was rolled for 1 hour on a roller mill and then 7.0 g of B60A Rhoplex Binder, 7.0 g of AC61 Rhoplex Binder, and 0.13 g of WP-1 Rhoplex Plasticizer were added;

c. the slip was shaken briefly; more dispersant was added if the mixture was too thick;

d. the slip was poured off the grinding media into a polypropylene bottle and de-aired by rolling for 1 hour; and thereafter e. the slip was vacuum de-aired prior to use.

The slip was cast onto coated release paper while on a surface heated to ≈50° C. (unused portion of slip was kept rolling slowly to prevent settling). Electrode patterns were screen printed onto appropriately sized pieces of thin organic tape, and printed and blank tapes stacked in a die so that the finished parts had 8 ineffective layers on top and bottom and 5 effective layers at the center, which assemblage requires 3 regular and 3 offset printed layers. The die was baked for 1 hour at 90° C. and then pressed at 10,000 psi for 90 seconds to form a laminate structure. The laminate was diced into individual capacitors while on a table heated to ≈60° C., utilizing a cutting blade heated to ≈70° C.

Individual capacitors were sintered on alumina or zirconia setter plates for 10 minutes at temperatures between 1000° C. and 1100° C. Squares for measuring dielectric constant were cut from the electrodeless edges of the stacks and sintered with green capacitors for use in measuring the dielectric constant. Silver paste terminations were applied to the sintered capacitors. The terminations were sintered on a traveling belt in a lehr programmed to heat from 100° C. to 825° C. in 16 minutes, followed by a 10 minute temperature decrease to 100° C. The total processing time was approximately 45 minutes.

Figure 3:
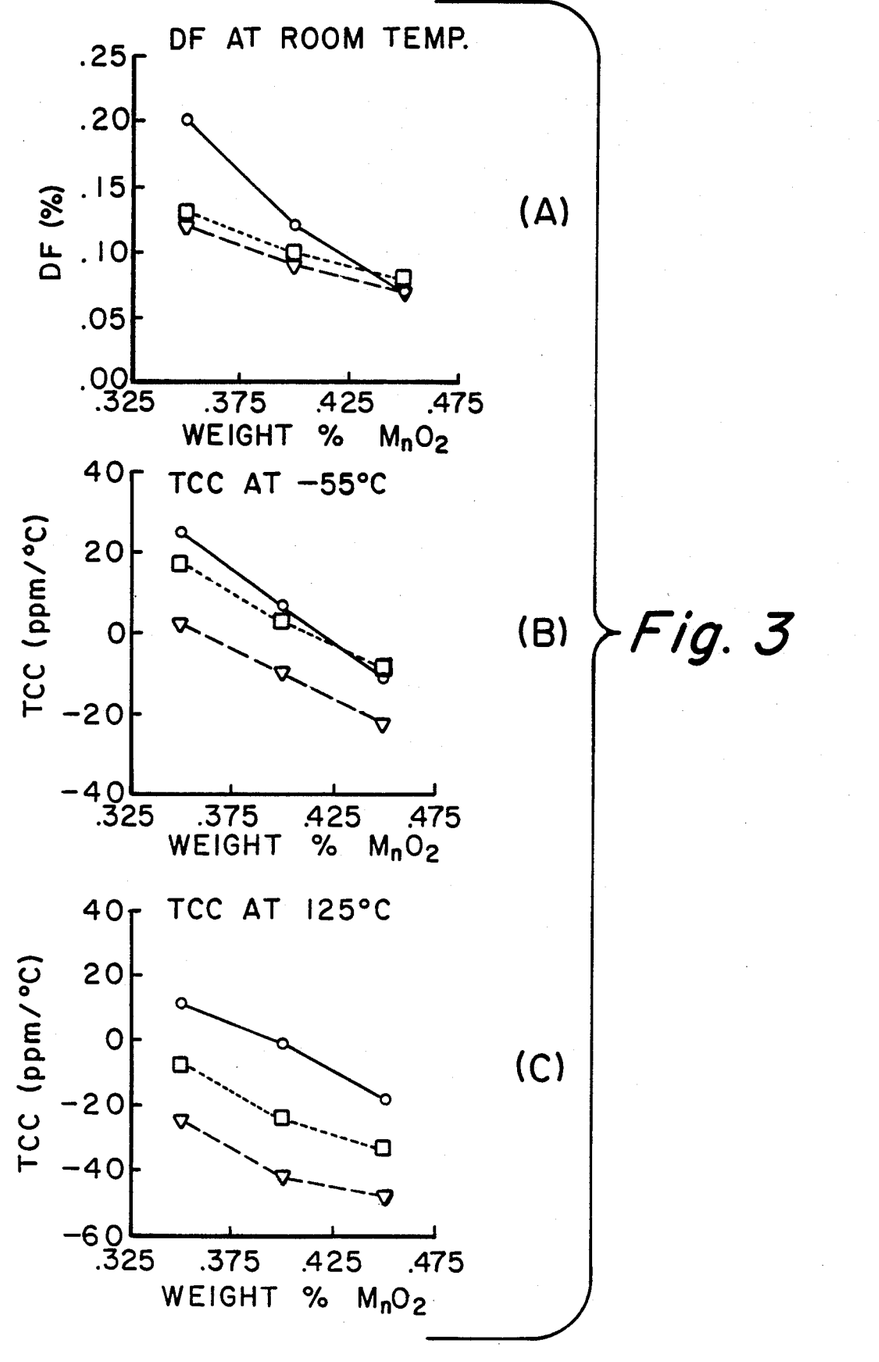
Figure 4:
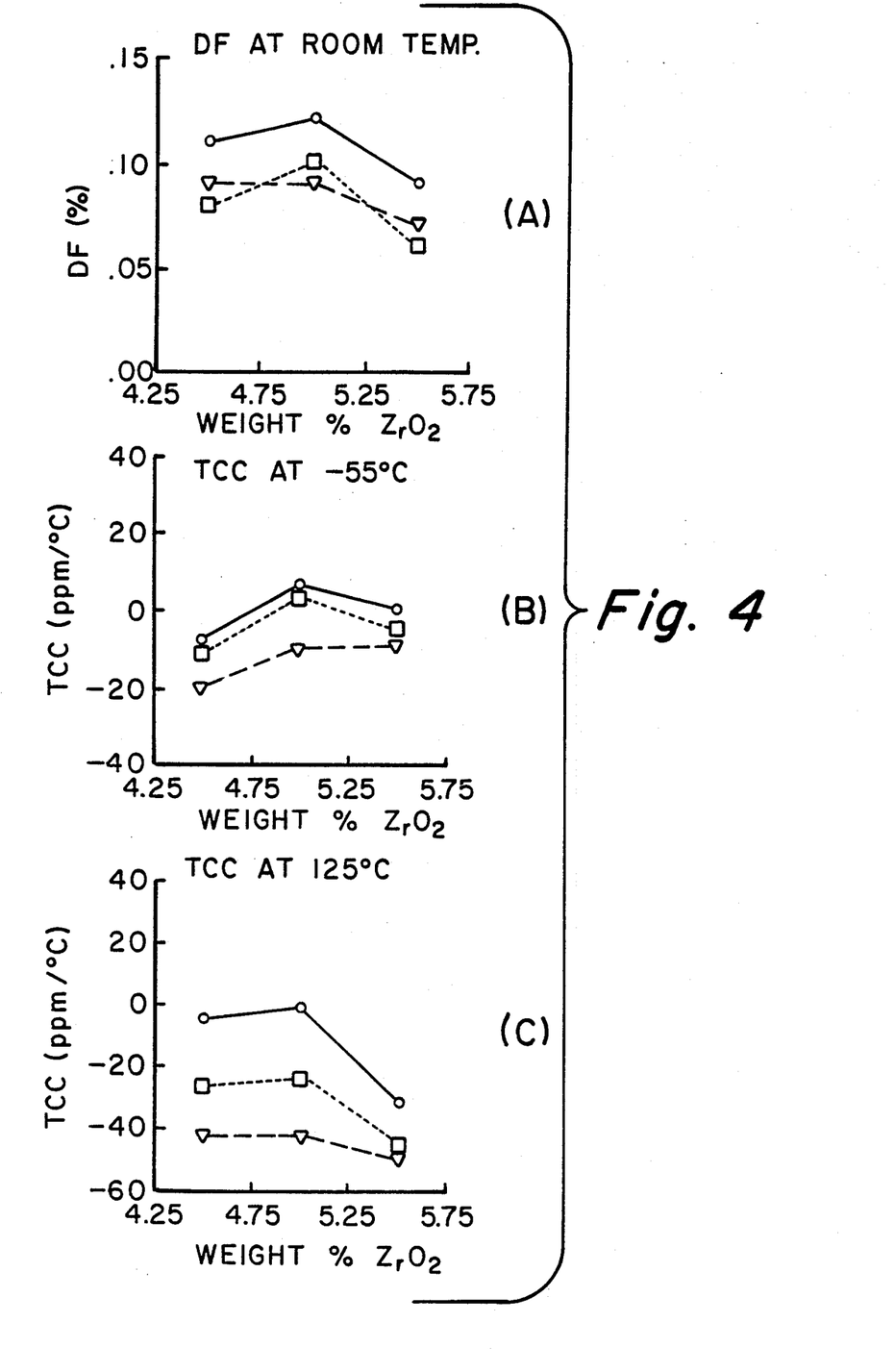

The parts having terminations thereon were impregnated in a bath of 5% Sn, 93.5% Pb, and 1.5% Ag at 320° C. to form electrodes. An injection overpressure of 200 psi was exerted for 90 seconds. The temperature dependencies of capacitance of the parts were measured at 1 MHz on a heating cycle at −55° C., 25° C., and 125° C., following 20 minute soaks at temperature. Dissipation factor measurements were made outside the temperature chamber with a HP16047C test fixture prior to beginning the temperature dependence run. The measured values at 25° C. were used as a basis for calculating temperature coefficients of capacitance (in ppm per ° C.) at −55° C. and 125° C. These data are shown in FIGS. 3 and 4. FIG. 3 reports values measured on bodies doped with 5 wt % $ZrO_2$ and FIG. 4 reports values measured on bodies doped with 0.4 wt % $MnO_2$. FIGS. 3a and 4a record Dissipation Factors measured at room temperature and FIGS. 3b and 3c and FIGS. 4b and 4c report Temperature Coefficients of Capacitance measured at −55° C. and 125° C., respectively. Note that unusually good combinations of small TCC and low dissipation factor are obtained for a large range of firing temperatures from 1015° C. to 1055° C. Further note that many compositions in this range exhibit TCC's and dissipation factors that meet the EIA specifications for NPO materials. In FIGS. 3 and 4 the solid line indicates a firing temperature of 1055° C.; the dotted line a firing temperature of 1035° C.; and the dashed line a firing temperature of 1015° C.

We claim:

1. A dielectric ceramic exhibiting a small temperature coefficient of capacitance across the temperature range of −55° C. to 125° C. when compared to the capacitance measured at room temperature at 1 KHz or 1 MHz, depending upon the capacitance of the material, and a dielectric constant in excess of 105, when measured at room temperature at 1 KHz or 1 MHz, which dielectric ceramic has a composition corresponding to the formula:

$$(Bi_2O_2)^{2+}(A_{m-1}B_mO_{3m+1})^{2-}$$

wherein A consists essentially of at least one element selected from the group consisting of Ca, Sr, Ba, Bi, and Pb, and B consists essentially of at least one element selected from the group consisting of Nb, Ta, and Ti, and at least part of B is replaced with a single pair of mixed ions selected from the group consisting of $$C_{\frac{1}{3}}^{2+}D_{\frac{2}{3}}^{5+} \quad (1)$$

$$E_{\frac{1}{4}}^{1+}D_{\frac{3}{4}}^{5+} \quad (2)$$

$$F_{\frac{1}{2}}^{3+}D_{\frac{1}{2}}^{5+} \quad (3)$$

and $$F_{\frac{2}{3}}^{3+}G_{\frac{1}{3}}^{6+} \quad (4)$$

wherein
$C^{2+}$ ions are selected from the group consisting of $Mg^{2+}$, $Zn^{2+}$, $Ni^{2+}$, $Co^{2+}$, $Cu^{2+}$, and $Cd^{2+}$;
$D^{5+}$ ions are selected from the group consisting of $Nb^{5+}$ and $Ta^{5+}$;
$E^+$ ions are selected from the group consisting of $Li^+$, $Na^+$, $K^+$, $Cu^+$, and $Ag^+$;
$F^{3+}$ ions are selected from the group consisting of $Cr^{3+}$, $Fe^{3+}$, $Al^{3+}$, $Ga^{3+}$, $Tl^{3+}$, $As^{3+}$, $Sb_{3+}$, $Y^{3+}$, $Lu^{3+}$, $Yb^{3+}$, $Tm^{3+}$, $Er^{3+}$, $Ho^{3+}$, $Dy^{3+}$, $Tb^{3+}$, $Gd^{3+}$, $Eu^{3+}$, and $Sm^{3+}$; and
$G^{6+}$ ions are selected from the group consisting of $W^{6+}$ and $Mo^{6+}$;
and wherein m is greater than 1.

2. The dielectric ceramic according to claim 1 wherein A is composed of at least one mixture of ions selected from the group consisting of $Ca_{0.6}Sr_{0.4}$ and $Ca_{0.5}Sr_{0.4}Ba_{0.1}$.

3. The dielectric ceramic of claim 1 having a composition corresponding to the formula $ABi_4Ti_4O_{15}$, wherein A is an element selected from the group consisting of Ca, Sr, Ba, Bi, and Pb, and Ti is replaced at least in part with a single pair of mixed ions selected from the group consisting of (1), (2), (3), and (4).

4. The dielectric ceramic according to claim 1 having a composition corresponding to the formula $CaBi_4(Mg_{\frac{1}{3}}Nb_{\frac{2}{3}})_4O_{15}$ wherein B is totally replaced with a single pair of mixed ions selected from the group consisting of $C^{2+}$ and $D^{5+}$.

5. The dielectric ceramic according to claim 1 having a composition corresponding to the formula $SrBi_4(Mg_{\frac{1}{3}}Nb_{\frac{2}{3}})_4O_{15}$ wherein B is totally replaced with a single pair of mixed ions selected from the group consisting of $C^{2+}$ and $D^{5+}$.

6. The dielectric ceramic according to claim 1 having a composition corresponding to the formula $CaBi_4(Ni_{\frac{1}{3}}Nb_{\frac{2}{3}})_4O_{15}$ wherein B is totally replaced with a single pair of mixed ions selected from the group consisting of $C^{2+}$ and $D^{5+}$.

7. The dielectric ceramic according to claim 1 having a composition corresponding to the formula $CaBi_4(Cu_{\frac{1}{3}}Nb_{\frac{2}{3}})_4O_{15}$ wherein B is totally replaced with a single pair of mixed ions selected from the group consisting of $C^{2+}$ and $D^{5+}$.

8. The dielectric ceramic according to claim 1 having a composition corresponding to the formula $CaBi_4(Fe_{\frac{2}{3}}W_{\frac{1}{3}})_4O_{15}$ wherein B is totally replaced with a single pair of mixed ions selected from the group consisting of $F^{3+}$ and $G^{6+}$.

9. A ceramic material exhibiting a small temperature coefficient of capacitance across the temperature range of −55° C. to 125° C. when compared to the capacitance measured at room temperature at 1 KHz or 1 MHz, depending upon the capacitance of the material, and a dielectric constant in excess of 105, when measured at room temperature at 1 KHz or 1 MHz, which material has a composition encompassed within the formula;

$$(Bi_2O_2)^{2+}(A_{m-1}B_mMn_\gamma O_{3m+\delta+1})^{2+}$$

wherein A consists essentially of at least one element selected from the group consisting of Ca, Sr, Ba, Bi and Pb, and B consists essentially of at least one element selected from the group consisting of Nb, Ta, and Ti, and at least part of B is replaced with a single pair of mixed ions selected from the group consisting of $$C_{\frac{1}{3}}^{2+}D_{\frac{2}{3}}^{5+} \quad (1)$$

$$E_{\frac{1}{4}}^{1+}D_{\frac{3}{4}}^{5+} \quad (2)$$

$$F_{\frac{1}{2}}^{3+}D_{\frac{1}{2}}^{5+}, \quad (3)$$

$$F_{\frac{2}{3}}^{3+}G_{\frac{1}{3}}^{6+} \quad (4)$$

$C^{2+}$ are selected from the group consisting of a $Mg^{2+}$, $Zn^{2+}$, $Ni^{2+}$, $Co^{2+}$, and $Cd^{2+}$,
$D5+$ ions are selected from the group consisting of $Nb^{5+}$ and $Ta^{5+}$;
$E^+$ ions are selected from the group consisting of $Li^+$, $Na^+$, $K^+$, $Cu^+$, and $Ag^+$;
$F^{3+}$ ions are selected from the group consisting of $Cr^{3+}$, $Fe^{3+}$, $Al^{3+}$, $Ga^{3+}$, $Tl^{3+}$, $As^{3+}$, $Sb_{3+}$, $Y^{3+}$, $Lu^{3+}$, $Yb^{3a+}$, $Tm^{3+}$, $Er^{3+}$, $Ho^{3+}$, $Dy^{3+}$, $Tb^{3+}$, $Gd^{3+}$, $Eu^{3+}$, and $Sm^{3+}$; and
$G^{6+}$ ions are selected from the group consisting of $W^{6+}$ and $Mo^{6+}$;
and wherein m is greater than 1, $\gamma$ is greater than 0, and $\delta$, the oxide contribution of manganese oxide, is greater than 0.

10. The dielectric ceramic according to claim 9 wherein A is composed of at least one mixture of ions selected from the group consisting of $Ca_{0.6}Sr_{0.4}$ and $Ca_{0.5}Sr_{0.4}Ba_{0.1}$.

11. The dielectric ceramic according to claim 9 having a composition corresponding to the formula $CaBi_4(Mg_{\frac{1}{3}}Nb_{\frac{2}{3}})_4Mn_\gamma O_{15+\delta}$ wherein B is totally replaced with a single pair of mixed ions selected from the group consisting of $C^{2+}$ and $D^{5+}$.

12. The dielectric ceramic according to claim 9 having a composition corresponding to the formula $SrBi_4(Mg_{\frac{1}{3}}Nb_{\frac{2}{3}})_4Mn_\gamma O_{15+\delta}$ wherein B is totally replaced with a single pair of mixed ions selected from the group consisting of $C^{2+}$ and $D^{5+}$.

13. The dielectric ceramic exhibiting a small temperature coefficient of capacitance across the temperature range of −55° C. to 125° C. when compared to the capacitance measured at room temperature at 1 KHz or 1 MHz, depending upon the capacitance of the material, and a dielectric constant in excess of 105, when measured at room temperature at 1 KHz or 1 MHz, which material has a composition encompassed within the formula;

$$(Bi_2O_2)_{2+}(A_{m-1}B_mZr_\beta O_{3m+\delta+1})^{2-}$$

wherein A consists essentially of at least one element selected from the group consisting of Na, Ca, Sr, Ba, and Bi, and B consists essentially of at least one element selected from the group consisting of Nb, Ta, and Ti, and at least part of B is replaced with a single pair of mixed ions selected from the group consisting of $$C_{\frac{1}{3}}^{2+}D_{\frac{2}{3}}^{5+}, \qquad (1)$$

$$E_{\frac{1}{4}}^{1+}D_{\frac{3}{4}}^{5+}, \qquad (2)$$

$$F_{\frac{1}{2}}^{3+}D_{\frac{1}{2}}^{5+}, \qquad (3)$$

$$F_{\frac{2}{3}}^{3+}G_{\frac{1}{3}} \qquad (4)$$

wherein:
C$^{2+}$ ions are selected from the group consisting of Mg$^{2+}$, Zn$^{2+}$, Ni$^{2+}$, Co$^{2+}$, Cu$^{2+}$, and Cd$^{2+}$;
D$^{5+}$ ions are selected from the group consisting of Nb$^{5+}$ and Ta$^{5+}$;
E+ions are selected from the group consisting of Li$^+$, Na$^+$, K$^+$, Cu$^+$, and Ag$^+$;
3+ ions are selected from the group consisting of Cr$^{3+}$, Fe$^{3+}$, Al$^{3+}$, Ga$^{3+}$, Tl$^{3+}$, As$^{3+}$, Sb$_{3+}$, Y$^{3+}$, Lu$^{3+}$, Yb$^{3+}$, Tm$^{3+}$, ER$'^{3+}$, Ho$^{3+}$, Dy$^{3+}$, Tb$^{3+}$, Gd$^{3+}$, Eu$^{3+}$, and Sm$^{3+}$; and
G$^{6+}$ ions are selected from the group consisting of W$^{6+}$ and Mo$^{6+}$; and wherein m is greater than 1, $\beta$ is greater than 0, and $\delta$, the oxide contribution of zirconia, is greater than 0.

14. The dielectric ceramic according to claim 13 wherein A is composed of at least one mixture of ions selected from the group consisting of Ca$_{0.6}$Sr$_{0.4}$ and Ca$_{0.5}$Sr$_{0.4}$Ba$_{0.1}$.

15. The dielectric ceramic according to claim 13 having a composition corresponding to the formula CaBi$_4$(Mg$_{\frac{1}{3}}$Nb$_{\frac{2}{3}}$)$_4$Zr$_{62}$O$_{15+\delta}$ wherein B is totally replaced with a single pair of mixed ions selected from the group consisting of C$^{2+}$ and D$^{5+}$.

16. The dielectric ceramic according to claim 13 having a composition corresponding to the formula SrBi$_4$(Mg$_{\frac{1}{3}}$Nb$_{\frac{2}{3}}$)$_4$Zr$_{62}$O$_{15+\delta}$ wherein B is totally replaced with a single pair of mixed ions selected from the group consisting of C$^{2+}$ and D$^{5+}$.

17. A ceramic material exhibiting a small temperature coefficient of capacitance across the temperature range of −55° C. to 125° C. no greater than 35 ppm/C when compared to the capacitance measured at room temperature at 1 KHz or 1 MHz, depending upon the capacitance of the material, and a dielectric constant in excess of 105, when measured at room temperature at 1 KHz or 1 MHz, and a dissipation factor no greater than 0.1% when measured at room temperature and 1 KHz or 1 MHz, which material has a composition encompassed within the formula;

$$(Bi_2O_2)^{2+}(A_{m-1}B_mMn_\gamma Zr_{62}O_{3m+\delta+1})^{2-}$$

wherein A consists essentially of at least one element selected from the group consisting of Na, K, Ca, Sr, Ba, Bi, and Pb, and B is replaced with a single pair of mixed ions selected from the group consisting of $$C_{\frac{1}{3}}^{2+}D_{\frac{2}{3}}^{5+}, \qquad (1)$$

$$E_{\frac{1}{4}}^{1+}D_{\frac{3}{4}}^{5+}, \qquad (2)$$

$$F_{\frac{1}{2}}^{3+}D_{\frac{1}{2}}^{5+}, \qquad (3)$$

and $$F_{\frac{2}{3}}^{3+}G_{\frac{1}{3}}^{6+} \qquad (4)$$

wherein:
C$^{2+}$ ions are selected from the group consisting of Mg$^{2+}$, Zn$^{2+}$, Ni$^{2+}$, Co$^{2+}$, Cu$^{2+}$, and Cd$^{2+}$;
D$^{5+}$ ions are selected from the group consisting of Nb$^{5+}$ and Ta$^{5+}$;
E+ions are selected from the group consisting of Li$^+$, Na$^+$, K$^+$, Cu$^+$, and Ag$^+$;
F$^{3+}$ ions are selected from the group consisting of Cr$^{3+}$, Fe$^{3+}$, Al$^{3+}$, Ga$^{3+}$, Tl$^{3+}$, As$^{3+}$, Sb$_{3+}$, Y$^{3+}$, Lu$^{3+}$, Yb$^{3+}$, Tm$^{3+}$, Er$^{3+}$, Ho$^{3+}$, Dy$^{3+}$, Tb$^{3+}$, Gd$^{3+}$, Eu$^{3+}$, and Sm$^{3+}$; and
G$^{6+}$ ions are selected from the group consisting of W$^{6+}$ and Mo$^{6+}$;
and wherein m is greater than 1, $\beta$ is greater than 0, $\gamma$ is greater than 0, and $\delta$, the oxide contributions of zirconia and manganese oxide, is greater than 0.

18. The dielectric ceramic according to claim 17 having a composition corresponding to the formula CaBi$_4$(Mg$_{\frac{1}{3}}$Nb$_{\frac{2}{3}}$)$_4$Zr$_{62}$Mn$_{65}$O$_{15+}$ wherein B is totally replaced with a single pair of mixed ions selected from the group consisting of C$^{2+}$ and D$^{5+}$.

19. The dielectric ceramic of claim 18 wherein 4–6 wt % of ZrO$_2$ and 0.3–0.5 wt % MnO$_2$ comprise the zirconia and manganese oxide constituents, respectively.

20. The dielectric ceramic of claim 18 wherein 4.5–5.5 wt % ZrO$_2$ and 0.35–0.45 wt % MnO$_2$ comprise the zirconia and manganese oxide constituents, respectively.

21. The dielectric ceramic according to claim 17 having a composition corresponding to the formula SrBi$_4$(Mg$_{\frac{1}{3}}$Nb$_{\frac{2}{3}}$)$_4$Zr$_{62}$Mn$_{65}$O$_{15+\delta}$ wherein B is totally replaced with a single pair of mixed ions selected from the group consisting of C$^{2+}$ and D$^{5+}$.

22. The dielectric ceramic of claim 21 wherein 4–6 wt % ZrO$_2$ and 0.3–0.5 wt % MnO$_2$ comprise the zirconia and manganese oxide constituents, respectively.

23. The dielectric ceramic of claim 21 wherein 4.5–5.5 wt % ZrO$_2$ and 0.35–0.45 wt % MnO$_2$ comprise the zirconia and manganese oxide constituents, respectively.

* * * * *

UNITED STATES PATENT AND TRADEMARK OFFICE
CERTIFICATE OF CORRECTION

PATENT NO. : 4,978,646

DATED : December 18, 1990

INVENTOR(S) : P.Bardhan/R.F.Bartholomew/D.M.Trotter/C.J.Yu

It is certified that error appears in the above-identified patent and that said Letters Patent is hereby corrected as shown below:

Col. 2, line 35, should read
--$Mn_\gamma$--, not "$Mn_{65}$".

Col. 2, line 50-52, should read
$\delta$ is determined by the oxygen contribution of Zr and Mn when added to the batch as zirconia and manganese oxide, but will be greater than 0--.

Col. 5, line 21, "$CaBi_4O_{15}$" should read --$CaBi_4Ti_4O_{15}$--.

Col.13, line 54, "35 ppm/C" should read --$\pm 30$ ppm/$^\circ$C--.

Col. 14, line 4, "$Zr_{62}O$" should read --$Zr_\beta O$--.

Col. 14, line 28, "$Sb_{3+}$" should read --$Sb^{3+}$--

Col. 14, line 38, "$Zr_{62}MN_{65}$" should read --$Zr_\beta Mn_\gamma$--.

UNITED STATES PATENT AND TRADEMARK OFFICE
CERTIFICATE OF CORRECTION

PATENT NO. : 4,978,646

DATED : December 18, 1990

INVENTOR(S) : P. Bardhan, et al.

It is certified that error appears in the above-identified patent and that said Letters Patent is hereby corrected as shown below:

Col. 14, line 50, "$Zr_{62}MN_{65}$" should read --$Zr_\beta Mn_\gamma$--.

Signed and Sealed this

Twenty-sixth Day of May, 1992

Attest:

DOUGLAS B. COMER

*Attesting Officer*      *Acting Commissioner of Patents and Trademarks*